US012719901B2

(12) United States Patent
Han et al.

(10) Patent No.: US 12,719,901 B2
(45) Date of Patent: Aug. 25, 2026

(54) APPARATUS AND METHOD FOR AUTOMATICALLY ANALYZING MALICIOUS EVENT LOG

(71) Applicant: NPCORE, INC., Seoul (KR)

(72) Inventors: Seung Chul Han, Seoul (KR); Hyo Seop Bang, Seoul (KR); Dong Hwan Sun, Seoul (KR)

(73) Assignee: NPCORE, INC., Seoul (KR)

( * ) Notice: Subject to any disclaimer, the term of this patent is extended or adjusted under 35 U.S.C. 154(b) by 75 days.

(21) Appl. No.: 18/711,035

(22) PCT Filed: Nov. 16, 2022

(86) PCT No.: PCT/KR2022/018125
§ 371 (c)(1),
(2) Date: May 16, 2024

(87) PCT Pub. No.: WO2023/090864
PCT Pub. Date: May 25, 2023

(65) Prior Publication Data

US 2025/0016185 A1 Jan. 9, 2025

(30) Foreign Application Priority Data

Nov. 18, 2021 (KR) ........................ 10-2021-0159268
Dec. 29, 2021 (KR) ........................ 10-2021-0191721

(51) Int. Cl.
*H04L 29/06* (2006.01)
*G06F 40/279* (2020.01)
(Continued)

(52) U.S. Cl.
CPC ........ *H04L 63/1425* (2013.01); *G06F 40/279* (2020.01); *G06F 40/40* (2020.01)

(58) Field of Classification Search
CPC ... H04L 63/1425; G06F 40/279; G06F 40/40; G06F 21/56
See application file for complete search history.

(56) References Cited

U.S. PATENT DOCUMENTS

2017/0279840 A1* 9/2017 Zhang ................. H04L 63/1425
2020/0076841 A1* 3/2020 Hajimirsadeghi .. H04L 63/1408
(Continued)

FOREIGN PATENT DOCUMENTS

KR 10-2019-0012716 A 2/2019
KR 10-2020-0025043 A 3/2020
(Continued)

OTHER PUBLICATIONS

International Search Report & Written Opinion for PCT/KR2022/018125 by Korean Intellectual Property Office dated Mar. 2, 2023.
(Continued)

*Primary Examiner* — Ka Shan Choy
(74) *Attorney, Agent, or Firm* — BROADVIEW IP LAW, PC

(57) ABSTRACT

Disclosed are a method and apparatus for automatically analyzing a malicious event log that is an endpoint threat event, by applying an artificial intelligence (AI)-based chat bot engine. An endpoint automatic analysis method comprises processing a log through grouping according to processes for efficient analysis of an event log, generating a sentence for a process behavior through a neuro-linguistic programming technique for AI analysis, generating data of malicious behaviors that actually operate to use the same as training data for AI model training, realizing a transformer algorithm-based learning system to learn the training data, identifying, in real time, a grouped event log through a BERT and LSTM algorithm-based event maliciousness automatic analyzer to analyze an actual malicious behavior, and detecting and automatically determining a threat event
(Continued)

when a malicious behavior target is equal to or greater than a certain similarity.

10 Claims, 16 Drawing Sheets

(51) Int. Cl.
*G06F 40/40* (2020.01)
*H04L 9/40* (2022.01)

(56) References Cited

U.S. PATENT DOCUMENTS

2020/0314117 A1* 10/2020 Nguyen ................ H04W 12/12
2021/0224179 A1* 7/2021 Gunda ................ G06F 9/45558

FOREIGN PATENT DOCUMENTS

KR 10-2020-0039912 A 4/2020
KR 20200039912 A * 4/2020 ............. G06N 20/00
KR 10-2020-0059540 A 5/2020
KR 20200059540 A * 5/2020 ........... G06F 21/552
KR 10-2192196 B1 12/2020
KR 10-2241859 B1 4/2021

OTHER PUBLICATIONS

Office Action for KR 10-2021-0191721 by Korean Intellectual Property Office dated Oct. 6, 2023.

Shash, Max (2021). "3 GPT-3 Tools for Developers, Software and DevOps Engineers, and SREs", DZone AI. URL: https://web.archive.org/web/20210927050414/https://dzone.com/articles/3-gpt-3-tools-for-developers-software-engineers-de.

Oak, Rajvardhan et al., "Malware Detection on Highly Imbalanced Data through Sequence Modeling," In Proceedings of the 12th ACM Workshop on Artificial Intelligence and Security (AISec'19), Association for Computing Machinery, XP058443987, Nov. 2019, ISBN: 978-1-4503-6833-9, DOI: 10.1145/3338501.3357374.

Vaswani, Ashish et al. "Attention Is All You Need", XP08097373212, arxiv: 1706.03762v5, Dec. 2017.

* cited by examiner

FIG. 1

100
AUTOMATIC JUDGMENT 150
ANALYSIS 140
BUILDING 130
STORAGE 120
GROUPING 110

Network 200
240
230
220
210

FIG. 7

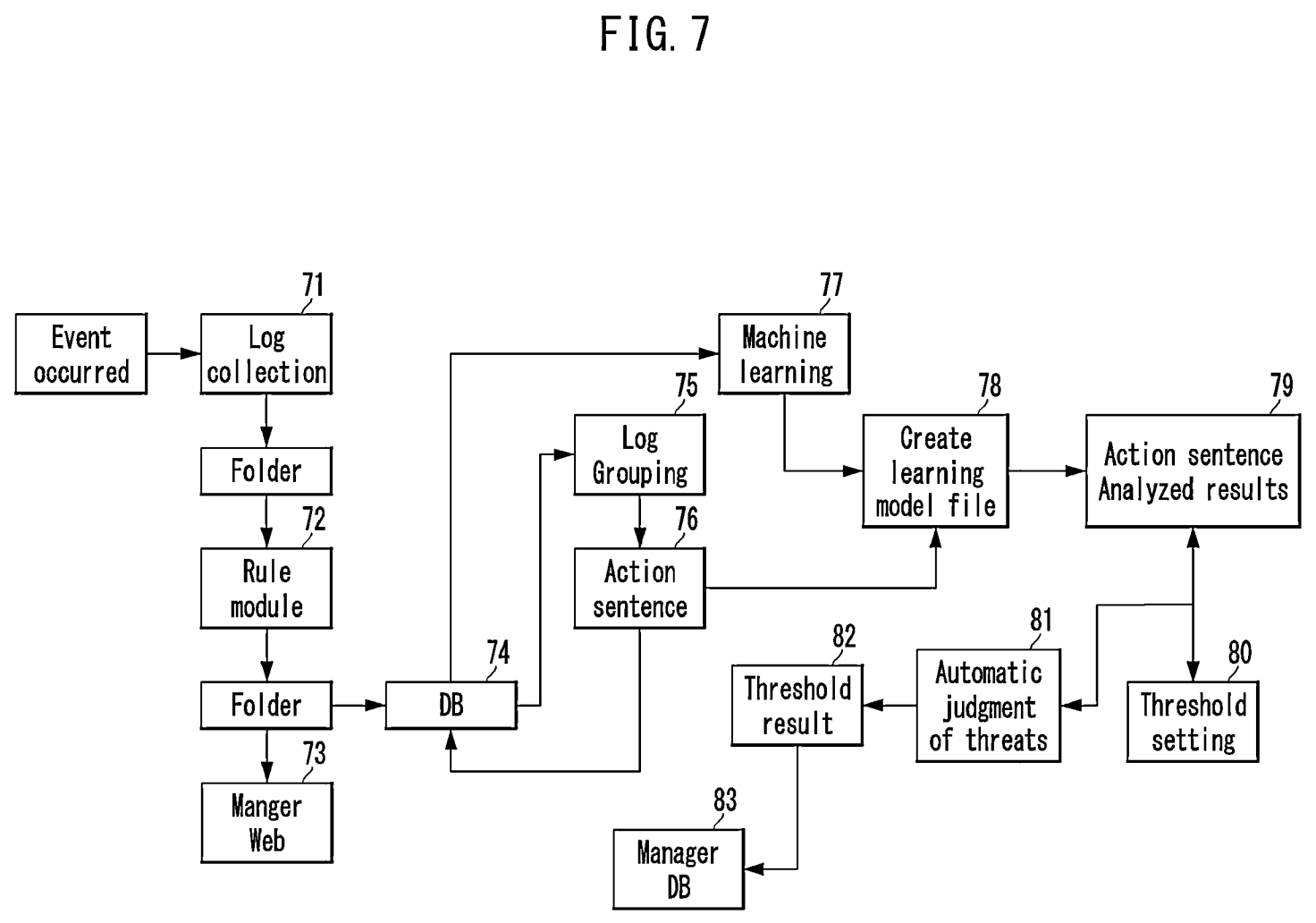

Event occurred

71 Log collection

Folder

72 Rule module

Folder

73 Manger Web

74 DB

75 Log Grouping

76 Action sentence

77 Machine learning

78 Create learning model file

79 Action sentence Analyzed results

80 Threshold setting

81 Automatic judgment of threats

82 Threshold result

83 Manager DB

```
"_source":{
    "dllname": "null",
    "event": "Terminated",  —S122
    "gen-date": 2020-11-09T21:18:29.469",
    "log-type": "ioc",
    "md5": "23e9d002c1d79eab7221c6318c8d367d",
    "mitre":[],
    "params":"",
    "parent-md5": "9520a99e77d6196d0d09833146424113",
    "parent-path": "C:₩₩Windows₩₩System32₩₩svchost.exe",
    "parent-pid": 852,
    "path": "C:₩₩Windows₩₩System32₩₩Speech_OneCore₩₩common₩₩SpeechRuntime.exe",
    "pid": 11744,
```

APPARATUS AND METHOD FOR AUTOMATICALLY ANALYZING MALICIOUS EVENT LOG

CROSS-REFERENCE TO RELATED APPLICATIONS

This application is a National Phase Entry Application of PCT Application No. PCT/KR2022/018125, filed on Nov. 16, 2022, which claims priority to Korean Patent Application No. 10-2021-0159268, filed on Nov. 18, 2021, and Korean Patent Application No. 10-2021-0191721, filed on Dec. 29, 2021, in the Korean Intellectual Property Office, the entire contents of which are hereby incorporated by reference in its entirety.

TECHNICAL FIELD

The present invention relates to a method of automatically analyzing a malicious event log, and more particularly, to an apparatus and method for automatically analyzing a malicious event log, which is an endpoint threat event, by applying an artificial intelligence (AI)-based chatbot engine.

BACKGROUND ART

With the continuous expansion of information and communication infrastructure, various forms of security threats that utilize information technology (IT) infrastructures are increasing rapidly. Recently, these advanced persistent threats (APTs) have frequently resulted in major information leakage incidents using malware in companies and weakened work concentration and information leakage incidents due to internal users' access to non-work sites. Accordingly, there is an urgent need to take measures to prevent these incidents.

In order to respond to security threats that are constantly causing damage, it is necessary to analyze a large amount of malware and threat-related data, and effective analysis of related data requires the development of a malware learning and classification module that analyzes images with automatic learning.

Meanwhile, foreign and domestic APT solution manufacturers related to existing malware detection and response technologies are proposing various types of response solutions to respond to new or variant malware according to the manufacturers, but it is not easy to respond to increasingly vast and sophisticated security threats in real time.

For this reason, endpoint detection and response (EDR) solution developers that research into malware detection techniques using machine learning are actively utilizing artificial intelligence (AI) technology to detect some cyber threats that cannot be detected using existing solutions based on signature, rules, and the like.

Also, endpoint incident response solutions are also being actively adopted to collect information from endpoint devices and automatically detect and respond to signs of cyberattacks in real time using correlation analysis and machine learning.

Further, a variety of threat intelligence tools are being developed for distributed remote forensics as a proactive response to malicious actions on personal computers (PCs) in workplaces. Also, a variety of static application security testing (SAST) tools are being developed to test the security of software applications developed in various languages such as C/C++, Ruby, Python, and the like.

To effectively analyze and respond to the foregoing malware or threat attacks, it is most desirable to analyze malware directly inside agents installed on PCs, terminals, servers, and the like, but such a solution has not been proposed yet.

DISCLOSURE

Technical Problem

The present invention is directed to providing an endpoint security solution for allowing an endpoint to automatically analyze and detect threat events using a chatbot engine.

The present invention is also directed to providing an automatic endpoint analysis apparatus and method for building an elastic search database (DB) management system (DBMS), which is a massive DB for building event log datasets, building a learning system based on a transformer network and a long short-term memory (LSTM) network for automatically analyzing and detecting a threat event log, providing an automated action event analysis function for effectively classifying malicious action events using a text classification function based on the learning system, and detecting a malicious event according to endpoint event detection rules.

The present invention is also directed to providing an artificial intelligence (AI)-based endpoint detection and response (EDR) solution to which a chatbot engine is applied.

The present invention is also directed to providing an automatic endpoint analysis apparatus and method for effectively and automatically analyzing a malicious event log by building an AI DB in which AI modules and event logs will be stored on an analysis server, installing an agent on a user personal computer (PC), analyzing an event of the user PC by the agent through rule matching, transmitting the analysis result in conjunction with the AI DB of the analysis server, performing grouping using a process identifier (PID) and session information, generating sentences in order of progress, that is, process actions, transmitting the sentences to the AI DB, and building datasets.

The present invention is also directed to providing an automatic endpoint analysis apparatus and method for collecting threat event data and event logs through application of AI technology, performing grouping by process ID and session ID (SID) or by process, automatically analyzing a threat process on the basis of AI, automatically judging a threat event on the basis of automatic analysis, and providing an analysis result of a transformer network and a process tree to provide a base for detection.

Technical Solution

One aspect of the present invention provides an apparatus for automatically analyzing a malicious event log which is an endpoint detection and response (EDR) device for automatic event analysis and detection to which an artificial intelligence (AI)-based chatbot engine is applied, the apparatus including a processor and a memory. According to at least one command stored in the memory, the processor processes a log through process-specific grouping for effective event log analysis, generates sentences about process actions using a natural language processing (NLP) technique for AI analysis, datafies malicious actions which are in actual operation, uses the data as training data for training an AI model, implements a learning system based on a transformer algorithm to perform training the AI model using the training data, checks, in real time, a grouped event log through an automatic event maliciousness analyzer based on bidirectional encoder representations from transformers (BERT) and long short-term memory (LSTM) algorithms to analyze an actual malicious action, and detects and automatically judges a malicious action target to be a threat event when the malicious action target has a certain similarity or more.

A deep learning-based chatbot engine for event log classification may operate according to an action sentence generation and labeling method for performing training the AI model using threat process actions, may be designed with optimal layers according to performance on the basis of six of encoder and decoder layers in a transformer architecture, may be configured to adjust a learning rate for optimizing a cost required for model training according to a learning time, may be configured as a model in which a transformer-based BERT model and a dense layer are combined, and may employ an optimal model based on F1-score comparison between an LSTM and gated recurrent unit (GRU)-based traditional recurrent neural network (RNN) model and a transformer-based model.

An AI module for event analysis may interoperate with an EDR system. Here, the AI module may interoperate with a cloud-based EDR solution to provide an integrated service.

The AI module may be managed by a management server which is in the form of an appliance disposed in each website or directly provided in a network on the basis of a cloud.

Another aspect of the present invention provides a method of automatically analyzing a malicious event log which is a method of building a DB for storing an AI module and event logs on an integrated analysis server, installing an agent on an endpoint, and performing rule matching on an event log through the agent to analyze a malicious event log, the method including grouping event logs using process identifiers (PIDs) and session information, generating sentences in order of process actions on the basis of the event logs, and automatically analyzing a malicious event log of an endpoint on the basis of a dataset included in the sentences generated in order of the actions.

Another aspect of the present invention provides a method of automatically analyzing a malicious event log, the method including processing logs through process-specific grouping for effective event log analysis, generating sentences about process actions using an NLP technique for AI analysis, datafying malicious actions which are in actual operation and using the data as training data for training an AI model, implementing a learning system based on a transformer algorithm to perform training the AI model using the training data, checking, in real time, a grouped event log through an automatic event maliciousness analyzer based on BERT and LSTM algorithms to analyze an actual malicious action, and detecting and automatically judging a malicious action target to be a threat event when the malicious action target has a certain similarity or more.

Another aspect of the present invention provides an apparatus for automatically analyzing a malicious event log which is an apparatus for building a DB for storing an AI module and event logs on an integrated analysis server, installing an agent on an endpoint, and performing rule matching on an event log through the agent to analyze a malicious event log, the apparatus including a processor and a memory configured to store at least one command performed by the processor. According to the at least one command, the processor groups event logs using PIDs and session information, generates sentences in order of process actions on the basis of the event logs, and automatically analyzes a malicious event log of an endpoint on the basis of a dataset included in the sentences generated in order of the actions.

Another aspect of the present invention provides an apparatus for automatically analyzing a malicious event log which is an automatic endpoint analysis device for EDR to which an AI-based chatbot engine is applied, the apparatus including a processor and a memory. According to at least one command stored in the memory, the processor processes logs through process-specific grouping for effective event log analysis, generates sentences about process actions using an NLP technique for AI analysis, datafies malicious actions which are in actual operation and uses the data as training data for training an AI model, implements a learning system based on a transformer algorithm to perform training the AI model using the training data, checks, in real time, a grouped event log through an automatic event maliciousness analyzer based on BERT and LSTM algorithms to analyze an actual malicious action, and detects and automatically judges a malicious action target to be a threat event when the malicious action target has a certain similarity or more.

A transformer model for the transformer algorithm may include an encoder layer and a decoder layer and, when a value obtained by adding 1 to a position of an embedding vector of each word in an embedding dimension in positional encoding (PE) of an input-side layer of the encoder layer is an odd value, may calculate the position of the word using Equation 1 given below, which is a cosine function, to generate positional information of a malicious action.

A transformer model for the transformer algorithm may include an encoder layer and a decoder layer and, when a value obtained by adding 1 to a position of an embedding vector of each word in an embedding dimension in PE of an input-side layer of the encoder layer is an even value, may calculate the position of the word using Equation 2 given below, which is a sine function, to generate positional information of a malicious action.

A decoder structure including the decoder layer may be trained to predict a word at each point in time from a sentence matrix and apply a layer for masking words at future points in time to prevent future words from being referenced to a forefront one of decoder sublayers.

Advantageous Effects

According to the foregoing present invention, an automatic malicious event log analysis apparatus and method to which an artificial intelligence (AI)-based chatbot engine is applied employ an endpoint detection and response (EDR) solution as a core engine. Accordingly, the EDR solution can be used as an analysis module of a solution which involves efficient and rapid classification and analysis of a large number of logs, and used as a solution for automatically judging whether there is a breach when a threat action occurs, through AI with no analyzer.

Also, automatic analysis employing AI according to the present invention is not limited to endpoint event log analysis but is applied to a visualization platform for testing malware to considerably increase the reliability of result values obtained by analyzing malware and malicious actions. In addition, the automatic analysis employing AI according to the present invention can be immediately applied to cloud-based security service products, such as security as a service (SECaaS), and the like.

The foregoing automatic malicious event log analysis apparatus or method of the present invention can be effectively applied to the following fields. In the advanced persistent threat (APT) response field, the apparatus or method can be applied to on-premise-type solutions for responding to APTs. In the EDR solution field, the apparatus or method can be applied to solutions for analyzing endpoint event actions and causes and responding to the endpoint event actions. In the SECaaS field, the apparatus or method can be applied to cloud-based solutions for responding to APTs and ransomware. In the security control field, the apparatus or method can be applied to endpoint threat information visualization for security control automation.

DESCRIPTION OF DRAWINGS

FIG. 1 is a diagram illustrating a main configuration and operating principle of an automatic event analysis and detection system to which an artificial intelligence (AI)-based chatbot is applied (hereinafter simply referred to as an "automatic analysis device") according to one embodiment of the present invention.

FIG. 7 is a diagram illustrating an interoperation interface between an EDR solution and an AI module, which may be employed in the automatic analysis device of FIG. 1.

FIG. 18 is a block diagram illustrating a process of evaluating AI-based automatic threat event analysis performance of the automatic analysis device of FIG. 1.

FIG. 19 is a block diagram illustrating a main configuration of an automatic analysis device according to another embodiment of the present invention.

MODES OF THE INVENTION

Figure 2:
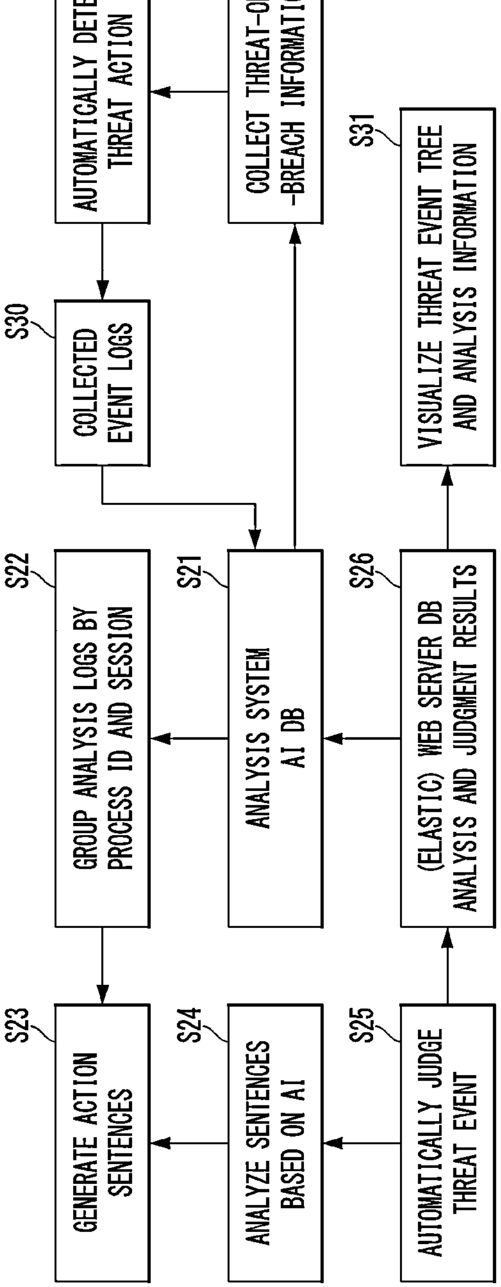
FIG. 2 is a diagram illustrating an AI-based threat-of-breach analysis process applied to endpoint detection and response (EDR) which may be employed in the automatic analysis device of FIG. 1.

Since the present invention can be variously modified and have several embodiments, specific embodiments will be illustrated in the drawings and described in detail. However, this is not intended to limit the present invention to the specific embodiments, and it is to be understood that the present invention includes all modifications, equivalents, and substitutions within the spirit and technical scope of the present invention. Throughout the drawings, like reference numerals refer to like components.

Terms including "first," "second," "A," "B," and the like may be used for describing various components, but the components are not limited by the terms. The terms are only used for the purpose of distinguishing one component from another. For example, a first component may be named a second component without departing from the scope of the present invention, and a second component may likewise be named a first component. The term "and/or" includes a combination of a plurality of related stated items or any one thereof.

When a component is referred to as being "connected" or "coupled" to another component, it is to be understood that the component may be directly connected or coupled to the other component, or an intermediate component may be therebetween. On the other hand, when a component is referred to as being "directly connected" or "directly coupled" to another component, it is to be understood that there is no intermediate component therebetween.

Terminology used in this specification is used only for describing specific embodiments and is not intended to limit the present invention. Singular forms include plural forms as well unless the context clearly indicates otherwise. In this specification, the terms "comprise," "comprising," "include," "including," "have," "having," and the like indicate the presence of features, integers, steps, operations, components, parts, or combinations thereof stated herein and do not preclude the possibility of presence or addition of one or more other features, integers, steps, operations, components, parts, or combinations thereof.

Unless otherwise defined, all terms including technical or scientific terms used herein have the same meanings as generally understood by those skilled in the technical field to which the present invention pertains. Terms defined in generally used dictionaries are construed as having the same meanings as would be construed in the context of the related art. Unless defined clearly in this application, the terms are not interpreted in an ideal or excessively formal sense.

Hereinafter, exemplary embodiments of the present invention will be described in detail with reference to the accompanying drawings. In describing the present invention, to facilitate overall understanding, like reference numerals will be given to like components, and duplicate descriptions thereof will be omitted.

Figure 1:
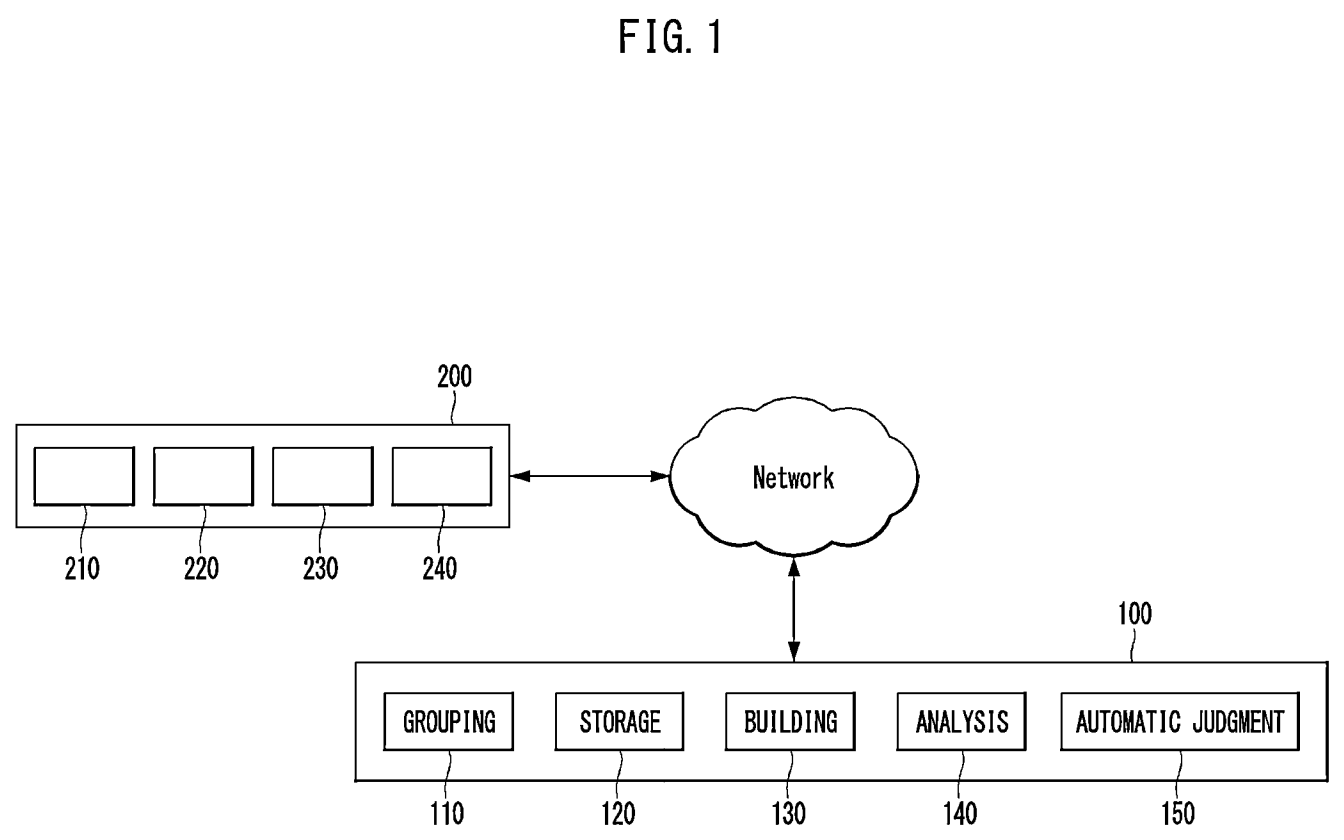

FIG. 1 is a diagram illustrating a main configuration and operating principle of an apparatus for automatically analyzing an event log of a malicious event, which is an endpoint threat event, using an artificial intelligence (AI)-based chatbot (hereinafter simply referred to as an "automatic analysis device") according to one embodiment of the present invention.

Referring to FIG. 1, an automatic analysis device 100 includes a first module 110 for grouping, a second module 120 for storage, a third module 130 for building datasets, a fourth module 140 for analysis, and a fifth module 150 for automatic judgment.

The first module 110 groups logs collected from a user personal computer (PC). The second module 120 quantifies and stores collected event logs or the grouped logs. The third module 130 builds datasets on the basis of the quantified logs. The fourth module 140 automatically analyzes event logs on the basis of a transformer model. The fifth module 150 automatically judges a threat event on the basis of the automatic analysis results of the event logs.

A transformer model for a transformer algorithm may have an encoder layer and a decoder layer and, when a value obtained by adding 1 to a position of an embedding vector of each word in an embedding dimension in positional encoding (PE) of an input-side layer is an odd value, may calculate a position pos of a word using Equation 1 given below, which is a cosine function, to generate positional information of a malicious action.

$$PE_{pos,2i+1} = \cos\left(\frac{pos}{10000^{\frac{2i}{D_{event\ analyzer}}}}\right) \quad \text{[Equation 1]}$$

In Equation 1, D represents the number of input dimensions of an event analyzer, and i represents the order of an input dimension among the input dimensions.

Also, a transformer model for a transformer algorithm may have an encoder layer and a decoder layer and, when a value obtained by adding 1 to a position of an embedding vector of each word in an embedding dimension in PE of an input-side layer is an even value, may calculate a position of a word using Equation 2 given below, which is a sine function, to generate positional information of a malicious action.

$$PE_{pos,2i} = \sin\left(\frac{pos}{10000^{\frac{2i}{D_{event\ analyzer}}}}\right) \quad \text{[Equation 2]}$$

In Equation 2, D represents the number of input dimensions of an event analyzer, and i represents the order of an input dimension among the input dimensions.

The automatic analysis device 100 may be connected to an AI analysis web management system 200 through a network. The AI analysis web management system 200 may be installed on an AI analysis server connected to the user PC and may include a module 210 for managing users by a manager, a module 220 for monitoring a current situation of collection or analysis, a module 230 for managing a collection and analysis system, and a module 240 for managing a current AI analysis situation.

The foregoing automatic analysis device 100 is an endpoint detection and response (EDR) device for automatic event analysis and detection to which an AI-based chatbot engine is applied and includes a processor and a memory. According to at least one command stored in the memory, the processor processes a log through process-specific grouping for effective event log analysis, generates sentences about process actions using a natural language processing (NLP) technique for AI analysis, datafies malicious actions which are in actual operation, uses the data as training data for training an AI model, implements a learning system based on a transformer algorithm to perform training the AI model using the training data, checks, in real time, a grouped event log through an automatic event maliciousness analyzer based on bidirectional encoder representations from transformers (BERT) and long short-term memory (LSTM) algorithms to analyze an actual malicious action, and detects and automatically judges a malicious action target to be a threat event when the malicious action target has a certain similarity or more.

A deep learning-based chatbot engine for event log classification may operate according to an action sentence generation and labeling method for performing training the AI model using threat process actions, may be designed with optimal layers according to performance on the basis of six of encoder and decoder layers in a transformer architecture, configured to adjust a learning rate for optimizing a cost required for model training according to a learning time, configured as a model in which a transformer-based BERT model and a dense layer are combined, and may employ an optimal model based on F1-score comparison between an LSTM and gated recurrent unit (GRU)-based traditional recurrent neural network (RNN) model and a transformer-based model.

Also, an AI module for event analysis may interoperate with an EDR system. Here, the AI module may interoperate with a cloud-based EDR solution to provide an integrated service. This AI module may be managed by a management server which is in the form of an appliance disposed in each website or directly provided in a network on the basis of a cloud.

Figure 3:
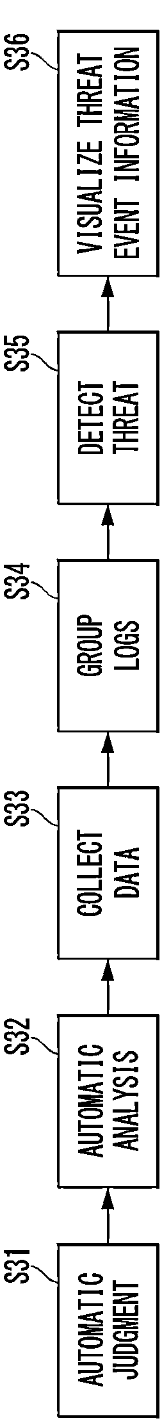
FIG. 3 is a diagram illustrating an AI-based threat action detection function applied to EDR which may be employed in the automatic analysis device of FIG. 1.
Figure 4:
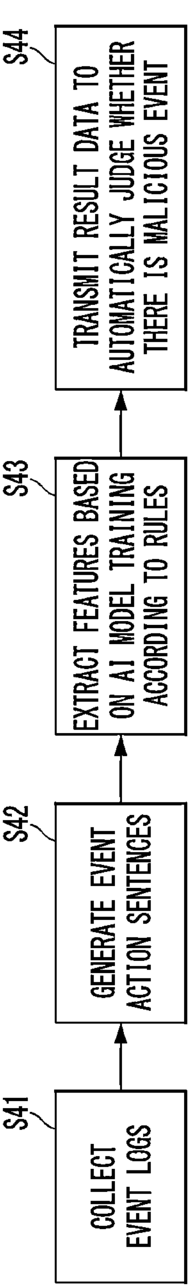
FIG. 4 is a schematic diagram illustrating the application of an AI analysis module which may be employed in the automatic analysis device of FIG. 1.

FIG. 2 is a diagram illustrating an AI-based threat-of-breach analysis process applied to EDR which may be employed in the automatic analysis device of FIG. 1. FIG. 3 is a diagram illustrating an AI-based threat action detection function applied to EDR which may be employed in the automatic analysis device of FIG. 1. FIG. 4 is a schematic diagram illustrating the application of an AI analysis module which may be employed in the automatic analysis device of FIG. 1.

Referring to FIG. 2, in an AI-based threat-of-breach analysis process applied to EDR which may be employed in the automatic analysis device, an EDR system or analysis system may standardize event logs by group and store the standardized event logs in an analysis system AI database (DB) (S21).

Subsequently, the analysis logs may be grouped by process identifier (PID) and session (S22).

Subsequently, action sentences may be generated from the event logs (S23).

Subsequently, the action sentences may be analyzed on the basis of AI (S24).

Subsequently, a threat event may be automatically judged on the basis of the analyzed action sentences (S25).

Subsequently, web server DB, for example, elastic DB, analysis and judgment results may be transmitted to a distributed system AI DB as the automatic judgment results, and a threat event tree and analysis information may be transmitted to a display device so that the threat event tree and analysis information is visualized (S26 and S31).

The event logs stored in the analysis system AI DB may be transmitted to an agent installed on a user PC and used for the agent to collect threat-of-breach information (S27).

Subsequently, the agent may automatically detect a threat action on the basis of the collected threat-of-breach information (S28).

Subsequently, an event log collected through automatic threat action detection may be reported to the analysis system AI DB (S30).

As shown in FIG. 3, after an automatic threat event judgment operation S31, an AI-based threat action detection method applied to EDR may include an automatic analysis operation S32, a data collection operation S33, a log grouping operation S34, a threat detection operation S35, and a threat event information visualization operation S36.

As shown in FIG. 4, after an operation S41 of collecting event logs, the AI-based threat action detection method may include an operation S42 of generating event action sentences, an operation S43 of extracting features on the basis of AI model training according to rules, and an operation S44 of transmitting result data to automatically judge whether there is a malicious event.

As described above with reference to FIGS. 2 to 4, an automatic threat event analysis and detection AI module, which is an automatic analysis device employing a chatbot engine, may interoperate with an EDR system for endpoint security.

The AI module may perform an interface migration task to transmit event log data, which has been transmitted to an existing web DB to apply AI to the EDR system, to a newly built AI analysis DB.

The AI module may have an elastic search database management system (DBMS) which is a massive DB for building event log datasets.

The AI module may have a transformer algorithm-based learning system to automatically analyze and detect event logs.

The AI module may have a function for automated action event analysis for classifying malicious action events using a text classification function or a configuration unit corresponding to the function.

The AI module may be configured to detect a malicious event according to endpoint event detection rules.

For the foregoing configuration, the AI module may collect threat event data and event logs, perform grouping by PID and session ID (SID) or by process, automatically analyze a threat process on the basis of AI, automatically judge a threat event on the basis of an automatic analysis result, automatically analyze a threat event through a web user interface (UI), and visualize and display the judgment result and a process tree.

As described above, according to the present embodiment, it is possible to automatically analyze an event log and automatically judge whether the event log is malicious, and it is also possible to have two advantages of high accuracy and rapid analysis by building an automated event analysis system.

Figure 5:
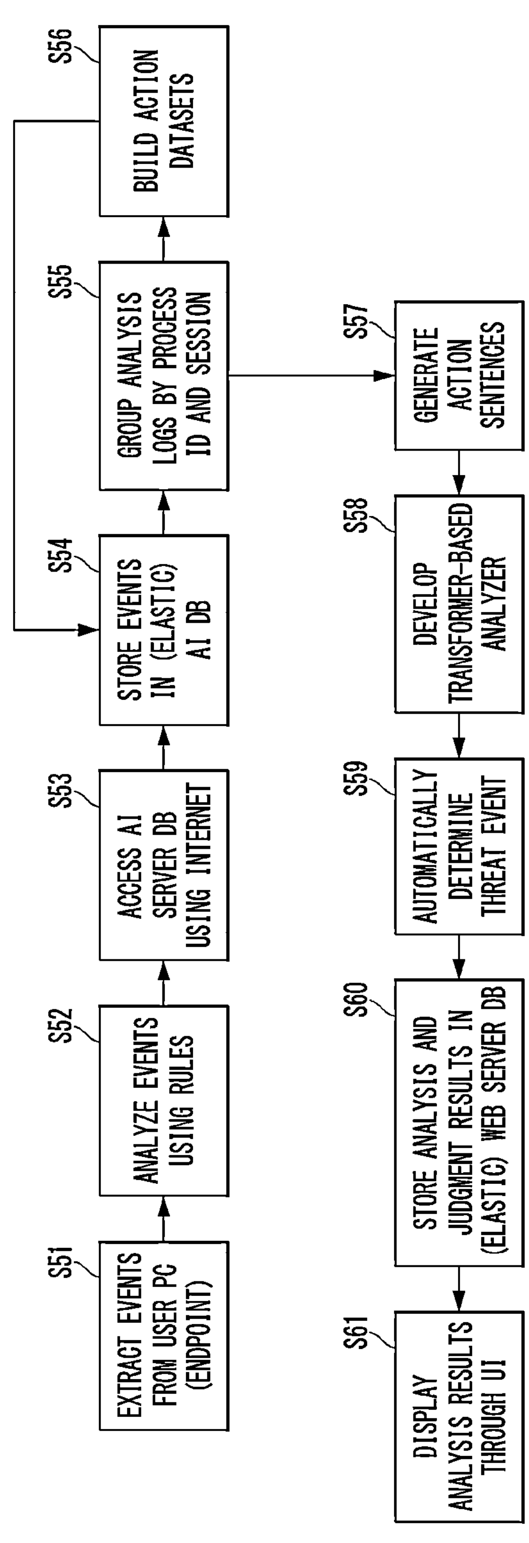
FIG. 5 is a schematic diagram illustrating an AI engine for automatically analyzing a threat event log on the basis of a chatbot engine which may be employed in the automatic analysis device of FIG. 1.

FIG. 5 is a schematic diagram illustrating an AI engine for automatically analyzing a threat event log on the basis of a chatbot engine which may be employed in the automatic analysis device of FIG. 1.

Referring to FIG. 5, the AI engine that may be employed in the automatic analysis device is a chatbot engine to which EDR is applied, and may analyze an event extracted from an endpoint using rules first time (S51 and S52) and store the analysis result in an AI analysis server DB (S53 and S54), and the AI module may perform analysis log grouping on the stored data by PID and SID. The rules may include indicators of compromise (IOC) breach indicator and the MITRE Adversarial Tactics, Techniques and Common Knowledge (ATT&CK) attack technique.

Also, the AI engine may generate event action sentences in consideration of the order of event groups, store the generated action sentences in the AI DB to collect data, and build datasets (S56). When these datasets are used for training a transformer-based model or an RNN model, a trained analyzer can be prepared.

According to this configuration, the AI engine may automatically analyze an input event log and calculate a classification probability through the trained analyzer, automatically judge a threat event on the basis of the classification probability, store analysis and judgment results in a web server DB, and visualize and provide transformer-based automatic analysis and judgement results and the order of process tree actions to a user through a web UI manager.

In addition, the AI engine may group action event logs collected through an agent using PIDs, sessions, and the like and generate action sentences from threat action events to build datasets (S57), develop a transformer-based analyzer for speed and syntax analysis of overall long sentences among text classification techniques using the built action event datasets and automatically detect a threat event log on the basis of analysis results of the analyzer (S58 and S59).

The automatically detected threat event may be stored in the web server DB, for example, an elastic DB, and used for automatically judging a threat event (S59). The analysis and judgment results may be stored in the web server DB or elastic DB (S60), and the analysis result or judgment result may be displayed through a UI (S61).

Figure 6:
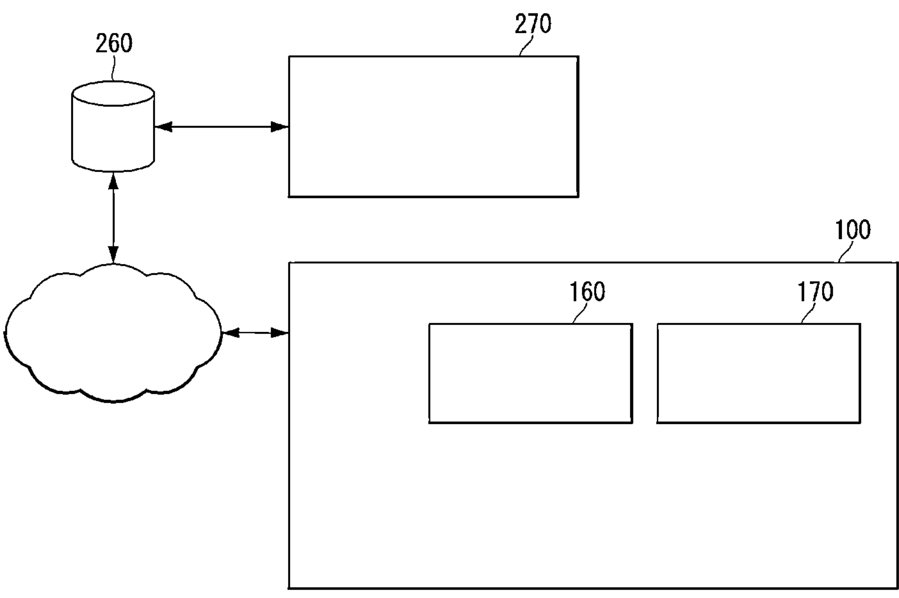
FIG. 6 is a schematic configuration diagram of an EDR system to which an AI module equipped with a chatbot engine is applied, which may be employed in the automatic analysis device of FIG. 1.

FIG. 6 is a schematic configuration diagram of an EDR system to which an AI module equipped with a chatbot engine is applied, which may be employed in the automatic analysis device of FIG. 1. FIG. 7 is a diagram illustrating an interoperation interface between an EDR solution and an AI module which may be employed in the automatic analysis device of FIG. 1.

Referring to FIG. 6, an AI-based EDR system 100 to which a chatbot engine is applied is an automatic analysis device and may include an AI module 160 and an AI DB 170 for storing event logs. The AI-based EDR system 100 may cause an agent installed on a user PC in a network through the AI module to analyze events of the user PC by performing rule matching and interoperate with the AI DB 170 of the analysis server to transmit the analysis results to the user PC, the analysis server, an elastic DB 260, and the like in the network. A web browser-based UI 270 may be installed in the elastic DB 260 to allow access of the user PC and other user terminals and communicate with the user PC.

A main operating principle of the AI module will be described below with reference to FIG. 7. The process described below may correspond to a constituent unit that performs the corresponding function.

When an event occurs, the AI module collects event logs from the agent (71). The collected log is stored in a specific folder. Subsequently, the AI module performs rule matching through a rule module 72 and stores the result in a specific folder. The collected log and the matching result may be provided to the user PC and the like in the web through a manager 73 or stored in a DB 74. Here, the manager 73 may be built as hardware (H/W) for a server or in a cloud environment and interoperate with the AI module on a virtualized operating system (OS) like a DB server.

Subsequently, the log stored in the DB 74 may be grouped (75), and an action sentence 76 may be generated from the grouped log. The generated action sentence 76 may be stored in the DB 74.

Also, machine learning 77 may be performed on the basis of results of matching with logs stored in the DB 74, and a learning model file may be created accordingly (78). The previously generated action sentence 76 may be used for generating the learning model file.

Subsequently, action sentence analysis results 79 may be generated using the learning model file. A threat may be automatically judged on the basis of the generated action sentence analysis results 79 and a threshold setting 80 (81), and when the judgment result is a certain threshold or more or less (82), the result may be stored in a manager DB (83).

In other words, results of analysis attempted at the agent may be called and grouped using PIDs and session information, and sentences are generated in order of progress and process actions and then transmitted to the AI DB to build datasets.

Figure 8:
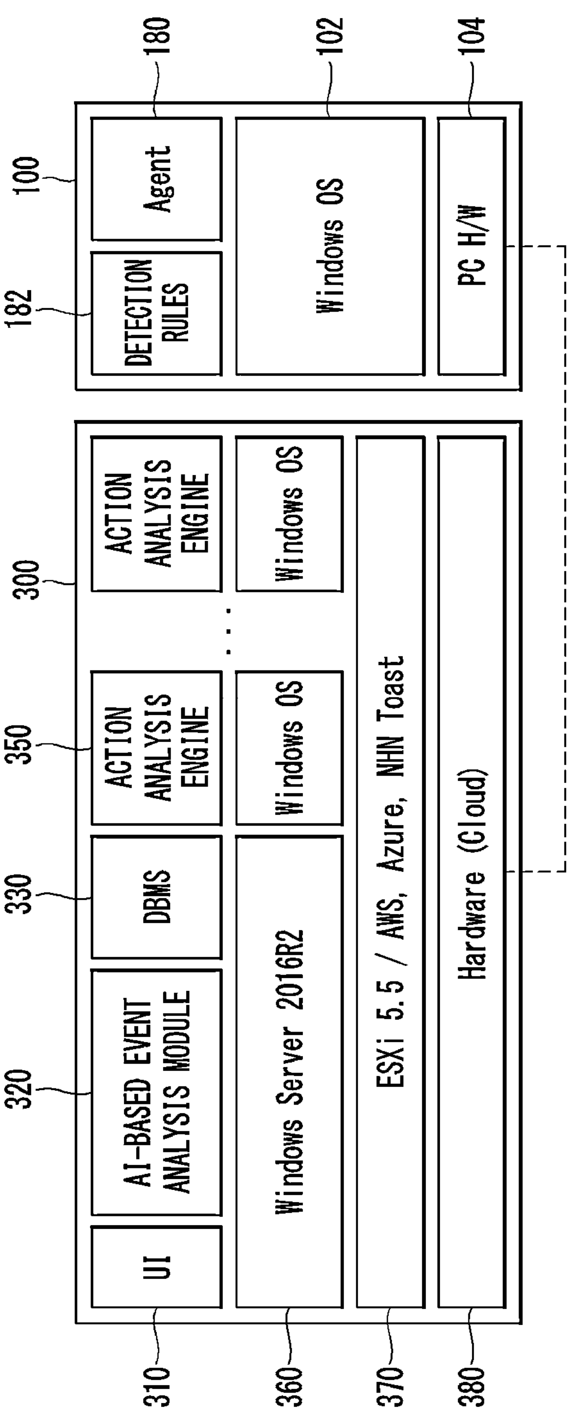
FIG. 8 is a schematic block diagram of a configuration to which an AI module for event analysis is applied, which may be employed in the automatic analysis device of FIG. 1.

FIG. 8 is a schematic block diagram of a configuration (EDR solution) to which an AI module for event analysis is applied, which may be employed in the automatic analysis device of FIG. 1.

Referring to FIG. 8, an EDR system corresponding to an EDR solution may broadly include an integrated EDR management server 300 and an agent 100. In other words, the EDR system according to the present embodiment may be built as an AI-based EDR system to which an AI module for event analysis is applied.

The integrated EDR management server (hereinafter simply referred to as an "integrated management server") 300 may include a UI 310, an AI-based event analysis module 320, a DBMS 330, a plurality of action analysis engines 350, a server OS, such as Windows server 2016R2 or the like, 360, a Windows OS, a platform 370, such as ESXi installed on HPE ProLiant servers, Amazon Web Services (AWS), Microsoft Azure, or the like, a cloud infrastructure for public institutions, such as NHN toast or the like, or the like, and H/W 380 supporting the components. The H/W 380 may be cloud-based H/W.

The EDR system may collect event information from an agent 180 of the endpoint 100, transmit the event information to the integrated management server 300, and store the information in the DBMS 330 in the integrated management server 300. The stored information may be sequentially collected by the AI-based event analysis module 320 to perform AI-based event analysis, and the analysis results may be applied to detection rules 182 in the endpoint 100.

The endpoint 100 may have, but is not limited to, a Windows OS 102 and PC H/W 104. The endpoint 100 may have other OSs, such as an Android OS and the like, which provide an environment for installing and running the agent 180.

As a device for performing an automatic malicious event log analysis method, the AI-based event analysis module 320 of the integrated management server 300 or the agent 180 of the endpoint 100 according to the present embodiment may perform an operation of processing a log through process-specific grouping for efficient event log analysis, an operation of generating sentences about process actions using an NLP technique for AI analysis, an operation of datafying malicious actions which are in actual operation and using the data as training data for training an AI model, an operation of generating a learning system based on a transformer algorithm to perform the training of the AI model using the training data, an operation of checking, in real time, a grouped event log through an automatic event maliciousness analyzer based on BERT and LSTM algorithms to analyze an actual malicious action, and an operation of detecting and automatically judging a malicious action target to be a threat event when the malicious action target has a certain similarity or more.

Figure 9:
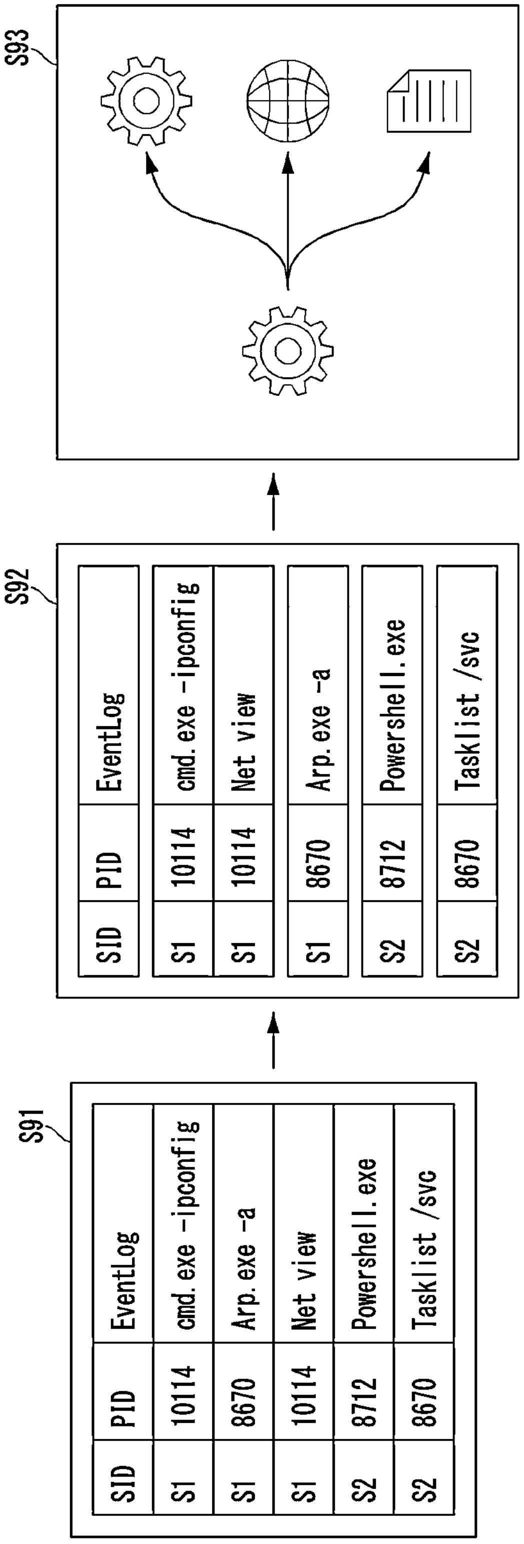
FIG. 9 is a diagram illustrating a process of grouping session identifiers (IDs) and process IDs (PIDs) in combination for each processor in an automatic malicious event log analysis method (hereinafter simply referred to as an "automatic analysis method") according to another embodiment of the present invention.

FIG. 9 is a diagram illustrating a process of grouping SIDs and PIDs in combination for each processor in an automatic malicious event log analysis method (hereinafter simply referred to as an "automatic analysis method") according to another embodiment of the present invention.

Referring to FIG. 9, a grouping process for automatically analyzing a malicious event log may include a log collection operation S91 and a grouping operation S92 and further include a UI display operation S93 of displaying grouped data in a UI.

In the log collection operation S91, event logs are collected and stored according to each SID and PID.

In the grouping operation S92, the collected event logs are grouped by SID or PID.

Figure 10:
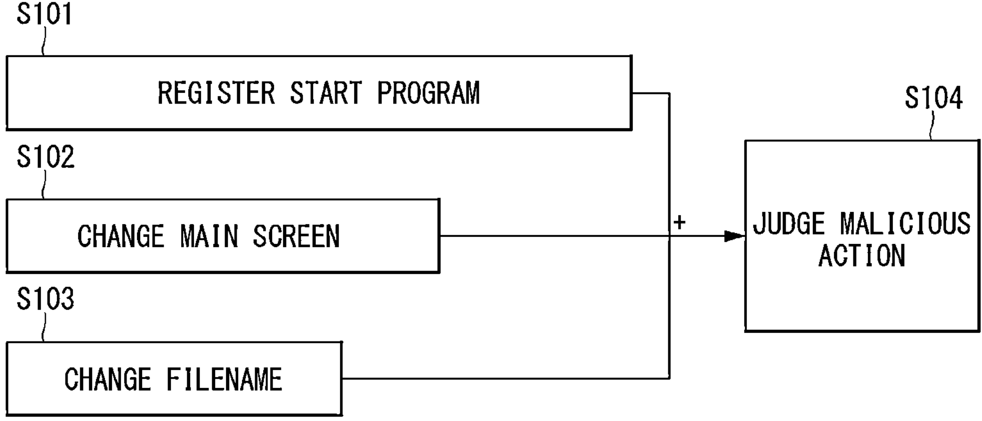
FIG. 10 is a diagram illustrating a malicious event in which normal actions do a ransom action together in the automatic analysis method of FIG. 9.

FIG. 10 is a diagram illustrating a malicious event in which normal actions do a ransom action together in the automatic analysis method of FIG. 9.

Referring to FIG. 10, a malicious event in which normal actions do a ransom action together may include a case of registering a start program for maintaining persistence and the like (S101), changing a main screen for a ransom note or the like (S102), and changing a filename for file encryption (S103) at the same time. These simultaneous events may be considered a ransomware operation and judged to be a malicious action (S104).

Figures 11, 12:
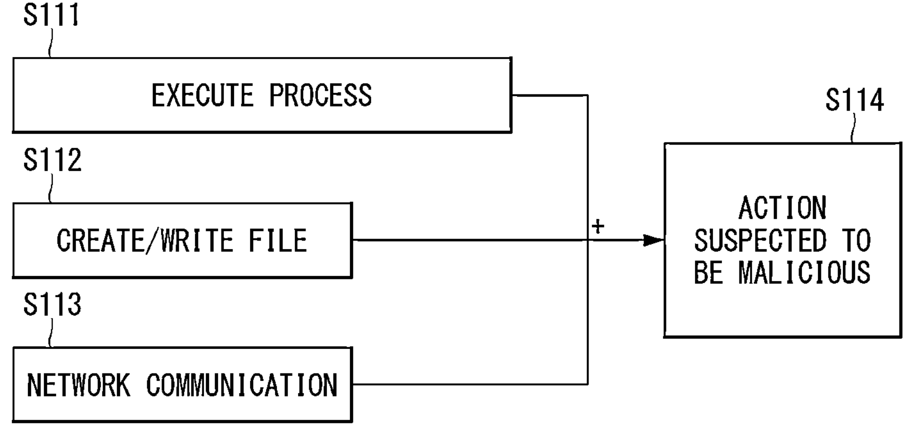
FIG. 11 is a diagram illustrating a malicious event in which normal actions do a network information collection or information transmission action together in the automatic analysis method of FIG. 9.
FIG. 12 is a view illustrating a malicious event that does not include "terminated" as an event type in the automatic analysis method of FIG. 9.

FIG. 11 is a diagram illustrating a malicious event in which normal actions do a network information collection or information transmission action together in the automatic analysis method of FIG. 9.

Referring to FIG. 11, a malicious event in which normal actions do a network information collection or information transmission action together may include a case of simultaneously performing process execution S111, file generation or writing S112, and network communication S113. This simultaneous event may be classified as an event suspected to be malicious and judged to be an action suspected to be malicious (S114).

As described above with reference to FIGS. 9 to 11, the automatic analysis method may employ an event log grouping technique for categorization of each process action. When only one event log is analyzed, the event log may be a threat action event. However, in most cases, event logs are normal action events, and actions judged to be normal actions do a threat action together. Therefore, grouping may be performed in chronological order using session IDs, such as a parent process ID and a current process ID, and a malicious event may be analyzed accordingly.

FIG. 12 is a view illustrating a malicious event that does not include "terminated" as an event type in the automatic analysis method of FIG. 9.

Referring to FIG. 12, in the automatic analysis method, a process action sentence generation process in which event logs are used may be used for an NLP technique. In other words, when an action is not "terminated" S122 in a grouped event log, the process is not finished. Accordingly, sentences may be generated by considering event types, changed values, a process execution path, and the order of actions in an event group with a "terminated" event, and a malicious event log may be automatically analyzed using the sentences.

Also, datasets may be built from action sequence sentences to generate a learning model. In this case, sentences generated by an event action sentence generator may be stored in a DB of an AI analysis server, and the event action sentences which are generated to detect a threat event may be labeled.

Figure 13:
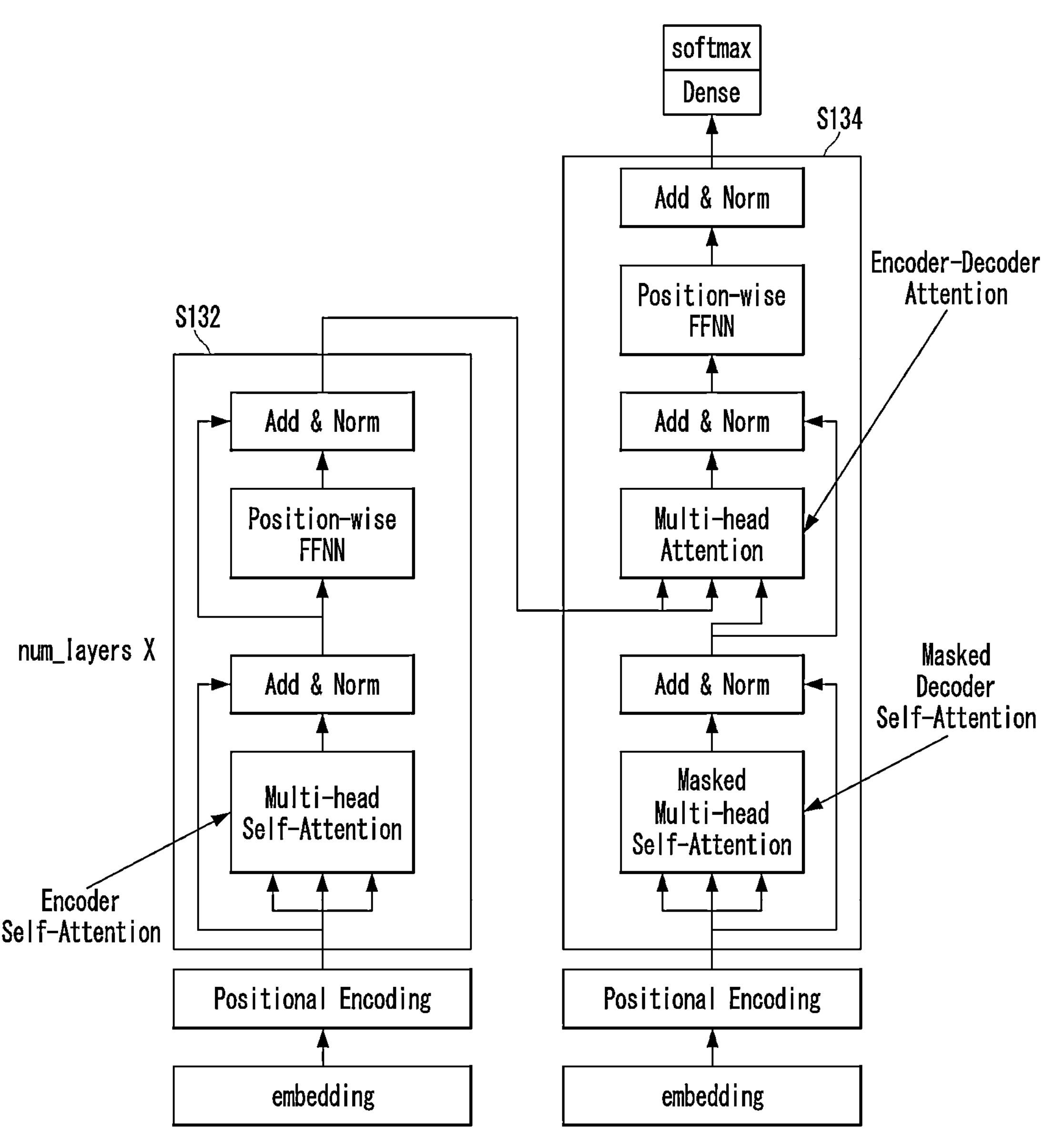
FIG. 13 is a block diagram of an architecture of a transformer model network which may be employed in the automatic analysis method of FIG. 9.

FIG. 13 is a block diagram of an architecture of a transformer model network which may be employed in the automatic analysis method of FIG. 9.

Referring to FIG. 13, the automatic analysis device may employ a learning system based on a transformer algorithm for AI analysis.

The learning system based on the transformer algorithm is capable of parallel processing, shows excellent performance in determining the meanings of words, and may include six of encoder and decoder layers.

For example, the automatic analysis device may input PE data of event log embedding in relation to the occurrence position to a first module, process the input data through encoder self-attention with multi-head self-attention in a first process S132 of the first module, add the input data and the encoder self-attention result, normalize the added data, execute a feed forward neural network (FFNN) on the basis of the position, add the result and the normalized data, normalize the added data, and output the normalized data.

Subsequently, the automatic analysis device may input the result of the first process S132 to multi-head self-attention of a second process of a second module. The second process S134 of the second module is a previous stage of the multi-head self-attention and may further include masked decoder self-attention with masked multi-head self-attention. The result of masked decoder self-attention may be added to input data of the corresponding module, normalized, and then input to the multi-head self-attention. Here, the multi-head self-attention may correspond to encoder-decoder attention.

An output of the second process S134 may be output through an output end, such as Softmax or the like, of a dense neural network.

The relationship between the foregoing two operations S132 and S134 of the first module and the second module may also be applied to two adjacent layers of a plurality of processes which are separately performed in a plurality of layers. In other words, the automatic analysis device may simultaneously perform an automatic judgment on each event log group in parallel through the transformer algorithm.

Also, in the case of performing attention, the number of heads that will be subjected to attention in parallel may be set to eight, and a cross entropy function may be adopted as a loss function to address multi-class classification problem. A learning rate for optimizing the loss function may be gradually reduced with the progress of learning, and thus the value may be tuned to facilitate convergence of the loss function.

Figure 14:
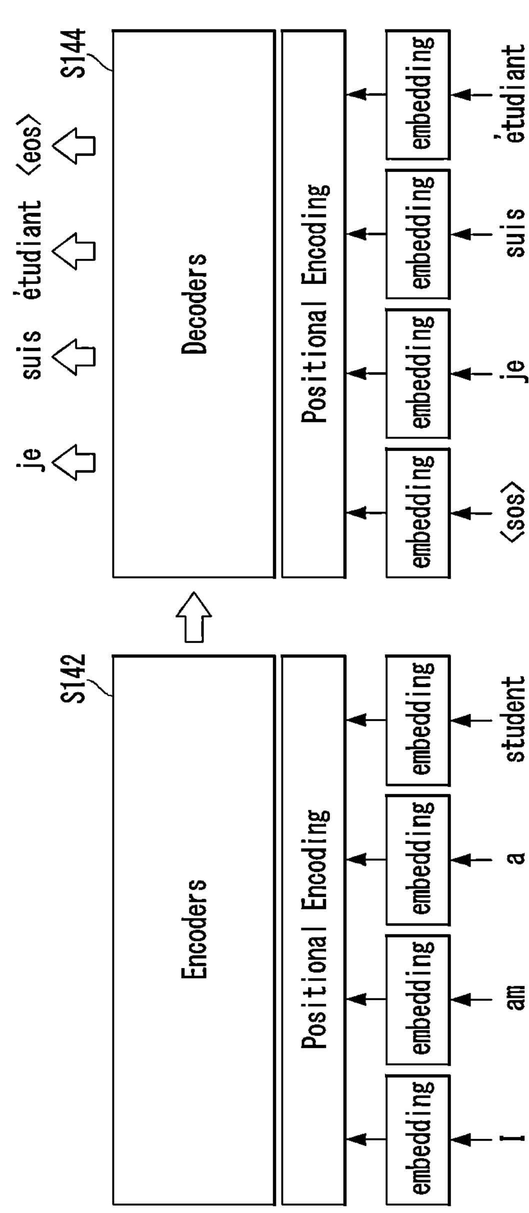
FIG. 14 is a diagram illustrating a structure of the transformer model of FIG. 13.

FIG. 14 is a diagram illustrating a structure of the transformer model of FIG. 13.

Referring to FIG. 14, the transformer model may include an encoder layer S142 and a decoder layer S144. Positional information of embedding vectors of words in PE of an input-side layer may be added and used as a model input.

A decoder structure may also be configured in the same way as the encoder structure so that a sentence matrix may be input after PE. The decoder structure may be trained to predict a word at each point in time from a sentence matrix. Also, a layer for masking words at future points in time to prevent the words from being referenced may be applied to a forefront one of decoder sublayers.

Figure 15:
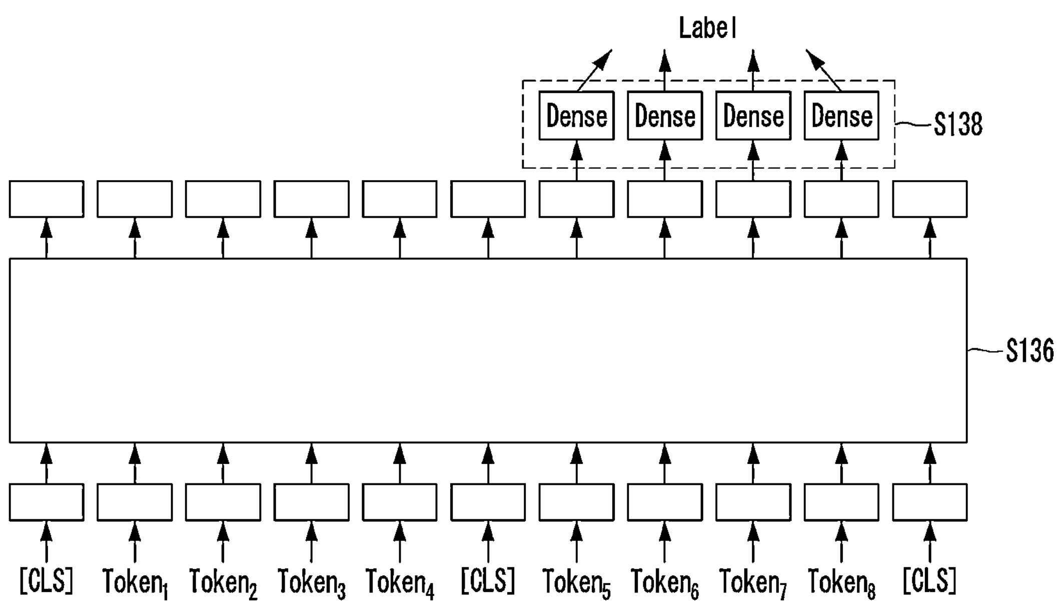
FIG. 15 is a diagram illustrating a text classification structure employing bidirectional encoder representations from transformers (BERT) and dense layers as another configuration which may be employed in the transformer model of FIG. 13.

FIG. 15 is a diagram illustrating a text classification structure employing BERT and dense layers as another configuration which may be employed in the transformer model of FIG. 13.

Referring to FIG. 15, the automatic analysis device may employ an automatic event analyzer S136 in which BERT and LSTM models are used. The analyzer S136 may utilize a BERT model having an advantage of fine-tuning to address the problem of finding the subject of a sentence and classifying the sentence. In this case, the BERT model may be trained in advance to use dense layers S138, which have as many outputs as the number of labels to be learned in the final classification, in combination.

The LSTM model shows excellent performance in processing a long-sequence input compared to a conventional RNN. Since the sequential event characteristic of threat processes is highly likely to result in a long sentence, it is preferable to use the LSTM model rather than the conventional RNN. Also, the LSTM model is frequently used in NLP, such as text classification, a chatbot system, and the like, and thus may be selectively used depending on the result of comparing the LSTM model and a transformer-based model.

Figure 16:
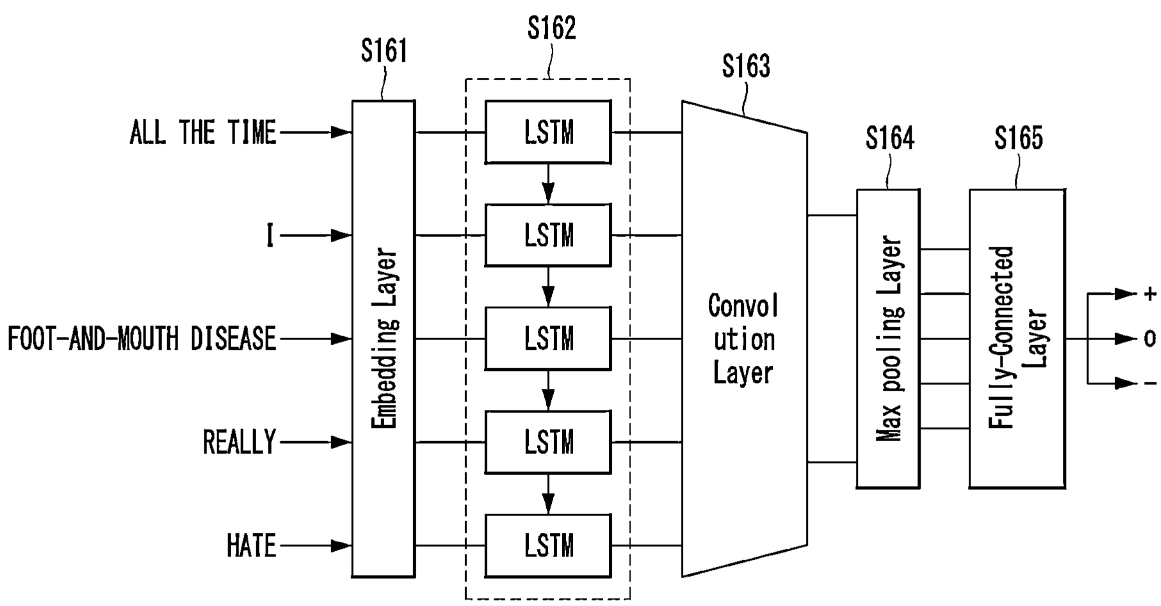
FIG. 16 is a diagram illustrating text classification employing long short-term memories (LSTMs) of FIG. 15 which may be used or replaced with the transformer model of FIG. 13.

FIG. 16 is a diagram illustrating text classification employing LSTMs of FIG. 15 which may be used or replaced with the transformer model of FIG. 13.

Referring to FIG. 16, a transformer-based BERT model and a LSTM and GRU-based model may be trained as text classification or query answering models using the same datasets, and verification data and results of a test dataset may be compared to selectively use a model with a higher F1-score.

For example, multiple LSTMs S162 may preprocess the text input "I really hate foot-and-mouth disease all the time" through an embedding layer S161, a convolution layer S163 learns the preprocessed text input, and then an automatic analysis result may be output through a max pooling layer S164 and a fully-connected layer S165. The automatic analysis result may be set to malicious event (+), non-malicious event (−), or suspension in judgment (0).

A computing device (corresponding to the automatic analysis device) for the foregoing event analysis or an AI module constituting at least a part of the computing device may be built in conjunction with an EDR system.

A management server may be provided in the form of an appliance for each website and implemented in the form of an EDR system interoperating with a built-in AI module to manage and serve a security agent or security as a service (SECaaS) for managing and serving a security agent on the basis of a cloud.

According to the present embodiment, an AI module can provide an integrated service in conjunction with an existing cloud-based EDR solution which provides a certain service. In this case, a setting interface and analysis result information of the AI module may be provided in conjunction with a graphical user interface (GUI) which is a management system of an EDR system.

An intelligent EDR analysis system (hereinafter simply referred to as an "analysis system") may include an endpoint security solution to which a technique for automatically analyzing and detecting a threat event using a chatbot engine is applied. This analysis system may be implemented in the form of an agent installed on a user PC for collecting events and may analyze the collected events first time using YARA rules and then store the analysis results in an AI DB. Then, the analysis system may perform an event grouping process on the analysis results collected in the AI DB by process ID and session, automatically analyze the processed events through an AI analyzer, and then store automatic event judgment results based on the automatic analysis results in a web server DB.

The analysis system may visualize and display analysis results and judgment results using a web browser-based UI.

The analysis system may automatically detect a threat event by performing AI-based syntax analysis on event actions. Also, the analysis system may automatically judge a threat event on the basis of automatic detection results. The analysis system may judge a threat process by analyzing actions using a blacklist for preventing the influx of new malware variants and then update the blacklist through a web UI. The analysis system may be configured to detect a threat event among events collected by a user PC using YARA rules.

The analysis system may collect process, registry, network, and file information generated by an endpoint, for example, a user PC, receive attack tactics, attack technique, and attack method information provided by MITRE ATT&CK, and provide a function of detecting a high ratio of none, telemetry, and general behavior types and, tactics or subordinates.

The analysis system may automatically analyze an event log using an AI analysis function, judge whether the event log is malicious and whether there is a breach action, and display the judgment information. This judgment information may include the attack tactics, attack technique, and attack method information provided by MITRE ATT&CK and may be increased up to a general behavior and tactic level or higher when it is saved.

Figure 17:
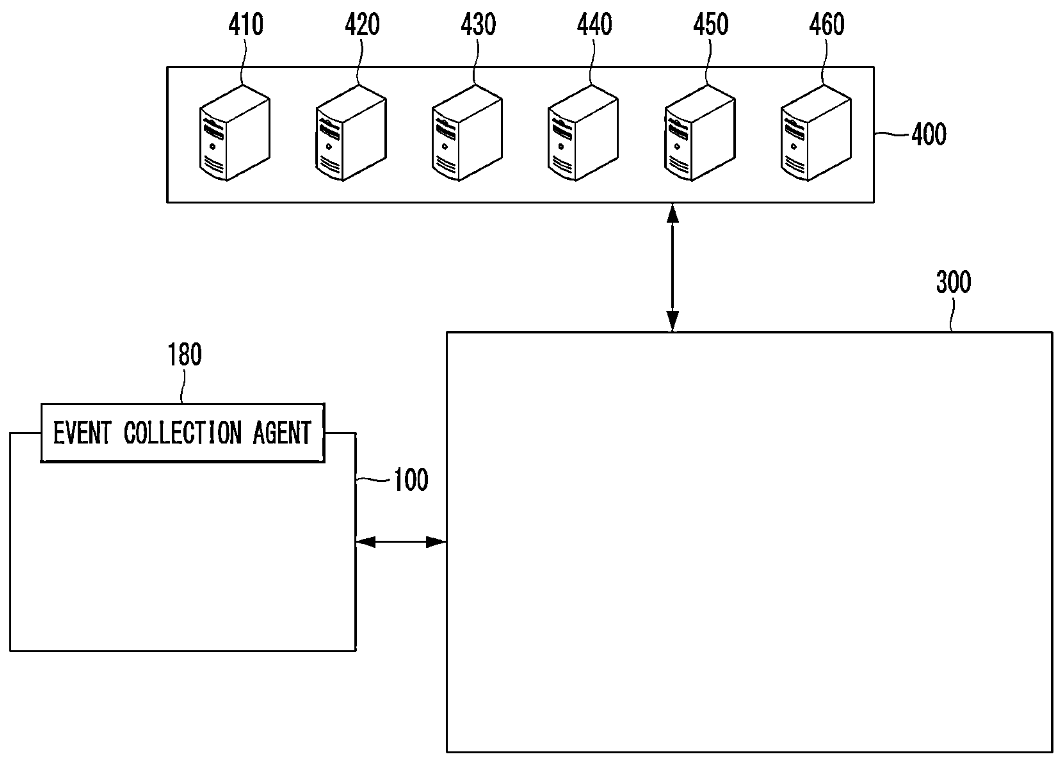
FIG. 17 is a block diagram illustrating a security service provided by the automatic analysis device of FIG. 1.

FIG. 17 is a block diagram illustrating a security service provided by the automatic analysis device of FIG. 1.

Referring to FIG. 17, a security service may be implemented in the form of an EDR product for detecting an endpoint threat action to which a chatbot engine is applied.

An automatic analysis device for this security service may be built as an external server 400 for collecting training data, providing a security notification, and making a backup and may communicate with other devices using the hypertext transfer protocol (HTTP). The external server 400 may include a short message service server 410, an update server, 420, a Virus Total server 430, a BitDefender server 440, a mail server 450, a backup server 460, and the like.

As a manager, the integrated management server 300 for EDR solution management is built as server hardware or in a cloud environment and installed on a virtual OS to interoperate with a DB server.

An AI-based event analysis system may be installed on the endpoint 100 or the integrated management server 300, implemented as PC hardware or in a virtual cloud environment, and run on an OS such as Windows server or the like. The agent 180 for collecting endpoint events and responding to a threat event may be configured to run on a specific endpoint such as Windows 7, Windows 10, or the like.

An endpoint threat action detection system to which a chatbot engine is applied is a AI-based event analysis system employing an automatic analysis device and may perform rule matching on event logs generated by a user PC, transmit the event logs to a DBMS as user PC event logs, group the user PC event logs collected in the DBMS into a process tree, store the grouped user PC event log in the DBMS, generate sentences in order of actions in the collected event log process tree, and generate an AI model based on deep learning, that is, transformers or LSTMs, using the generated sentences as a dataset for AI model training.

The foregoing system may perform automatic analysis through an AI model, which is generated by transmitting event logs actually generated by the endpoint 100, such as a user PC or the like, to an AI analysis system of the integrated management server 300, to output similarity, transmit an automatic threat process judgment analysis result and an automatic judgment result to a DBMS, and visualize and display a process tree and automatic AI analysis and judgment results through a web UI.

The foregoing endpoint threat action detection system to which a chatbot engine is applied may include the following modules. In other words, the system may include a process tree action sequence sentence generation module, a transformer network-based or a LSTM network-based network model learning module employing a TensorFlow framework, an automatic analysis and similarity output module employing the transformer network and LSTM network-based learning module, a library for dataset processing, an automatic analysis result-based automatic threat process detection module, and a virtualization module for visualizing analysis results and automatic judgment results through a web UI.

The library may include at least one selected from among scikit-learn, pandas, NumPy libraries.

According to the present embodiment, when action information is collected from an endpoint and stored in a central storage server and an automatic security threat event analysis process is performed through AI analysis on the stored action information, it is possible to efficiently and rapidly classify and analyze a large number of logs, and when a threat action occurs, whether there is a breach can be automatically determined by AI without an analyzer.

Also, when AI-based automatic analysis is applied to not only endpoint event log analysis but also a visualization platform for testing malicious code, it is possible to significantly increase the reliability of analysis result values of malware and malicious actions, and AI-based automatic analysis can be directly applied to a cloud-based security service product such as SECaaS.

Figures 18, 19:
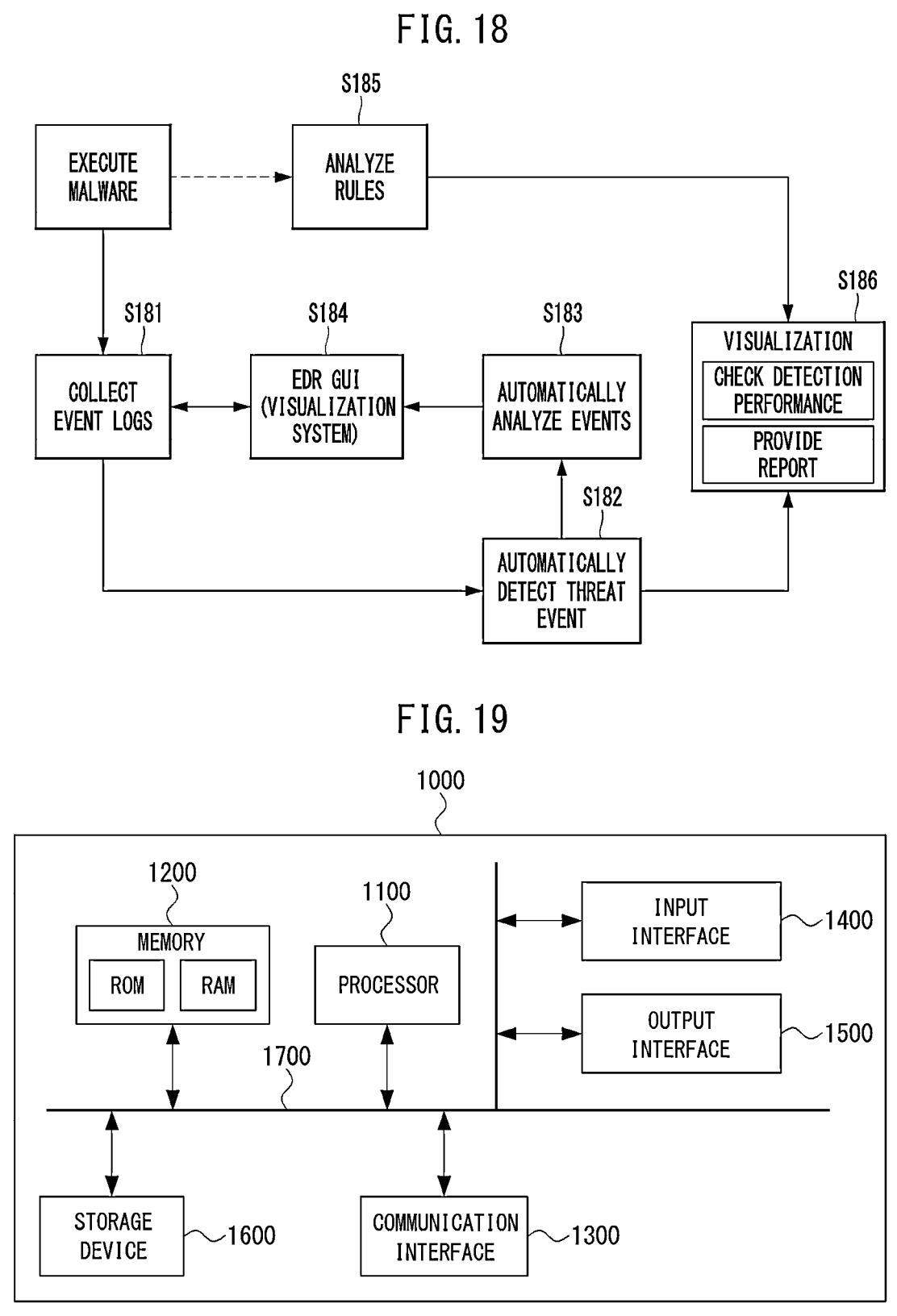

FIG. 18 is a block diagram illustrating a process of evaluating AI-based automatic threat event analysis performance of the automatic analysis device of FIG. 1.

Referring to FIG. 18, performance of an AI-based automatic threat event analysis method may be evaluated as follows.

First, in an event log collection operation S181, malicious information may be collected from known five malicious information collection channels, for example, Virus Total, Virus Sign, BitDefender, and the like, with the execution of malware, and about 200 malicious files of each malicious information collection channel and 1000 holding normal files may be used as samples for performance evaluation.

Here, a test bed for evaluating automatic threat event analysis may be built using a "virtualization-based passive malicious action analysis and visualization platform" which is a kind of automatic analysis device described in the present embodiment.

Subsequently, when event logs are collected with the execution of the malware, an automatic threat event detector is executed through a chatbot engine (S182). Automatic detection results at an endpoint or the like with the execution of the malware may be visualized along with results of rule analysis S185 in a UI (S186). The visualized information makes it possible to check detection performance and provide a report to a user or the like.

Subsequently, the automatic detection results may be subjected to an automatic event analysis process S183 and then transmitted to a visualization system S184.

Subsequently, automatic event analysis results may be checked through an EDR GUI of the visualization system S184 which interoperates with an AI module, and a test bed UI may be checked to measure a test result.

According to the foregoing embodiments, it is possible to effectively respond to unknown security threats and new and variant threats that incapacitate existing antivirus. Also, a system for automatically coping with a cyber threat through IOC-based forensic analysis is built, significantly reducing human errors and time limitations in manual analysis. Further, introduction of an AI-based event analysis technique allows rule creation and distribution through an automated analysis system, which leads to efficient building of a self-evolving threat response system. In addition, it is possible to generate and distribute reliable information by sharing latest threat information with other institutions and other systems and minimize cyber damage by reducing response time to malicious threats.

FIG. 19 is a block diagram illustrating a main configuration of an image-based malware detection device according to another embodiment of the present invention.

An automatic malicious event log analysis apparatus (simply an "automatic analysis device") 1000 of the present embodiment may be installed as at least a partial constituent unit of a server-side EDR system or at least a partial constituent unit of an endpoint agent.

Referring to FIG. 19, the automatic analysis device 1000 may include at least one processor 1100, a memory 1200, and a transceiver device 1300 which includes a communication interface and is connected to a network to perform communication. Also, the automatic analysis device 1000 may further include an input interface device 1400, an output interface device 1500, and a storage device 1600. The components included in the automatic analysis device 1000 may be connected through a bus 1700 to communicate each other.

However, the components included in the automatic analysis device 1000 may be connected through individual interfaces or individual buses centering on the processor 1100 instead of the common bus 1700. For example, the processor 1100 may be connected to at least one of the memory 1200, the transceiver device 1300, the input interface device 1400, the output interface device 1500, and the storage device 1600 through a dedicated interface.

The processor 1100 may execute program commands stored in at least one of the memory 1200 and the storage device 1600. The processor 1100 may be a central processing unit (CPU), a graphics processing unit (GPU), or a dedicated processor for performing methods according to embodiments of the present invention.

Each of the memory 1200 and the storage device 1600 may be configured as at least one of a volatile storage medium and a non-volatile storage medium. For example, the memory 1200 may be configured as at least one of a read only memory (ROM) and a random access memory (RAM).

At least one command stored in the memory 1200 or the storage device 1600 or installed in the processor 1100 for execution may cause the processor to perform an operation of processing logs through process-specific grouping for effective event log analysis, an operation of generating sentences about process actions using an NLP technique for AI analysis, an operation of datafying malicious actions which are in actual operation and using the data as training data for training an AI model, an operation of generating a learning system based on a transformer algorithm to perform the training of the AI model using the training data, an operation of checking, in real time, a grouped event log through an automatic event maliciousness analyzer based on BERT and LSTM algorithms to analyze an actual malicious action, and an operation of detecting and automatically judging a malicious action target to be a threat event when the malicious action target has a certain similarity or more.

The operations of the foregoing methods according to embodiments of the present invention can be implemented as a computer-readable program or code in a computer-readable recording medium. The computer-readable recording medium includes any type of recording device in which data that can be read by a computer system is stored. Also, a program or code that may be distributed across computer systems connected through a network and read by computers in a distributed manner may be stored and executed in the computer-readable recording medium.

The computer-readable recording medium may be a hardware device that is specially configured to store and execute a program command such as a ROM, a RAM, a flash memory, or the like. The program command may be not only machine code that is created by a compiler but also high-level language code that can be executed by a computer using an interpreter or the like.

Some aspects of the present invention have been described in the context of a device but may be described using a method corresponding thereto. Here, blocks or the device corresponds to operations of the method or characteristics of the operations of the method. Similarly, aspects of the present invention described above in the context of a method may be described using blocks or items corresponding thereto or characteristics of a device corresponding thereto. Some or all operations of the method may be performed by (using) a hardware device, for example, a microprocessor, a programmable computer, or an electronic circuit. In some embodiments, one or more important operations of the method may be performed by such a device.

In embodiments, a programmable logic device (e.g., a field programmable gate array) may be used to perform some or all of functions of the methods described herein. In embodiments, the field programmable gate array may operate with a microprocessor for performing one of the methods described herein. In general, the methods may be performed by any hardware device.

The invention claimed is:

1. A method of building a database (DB) for storing an artificial intelligence (AI) module and event logs on an integrated analysis server, installing an agent on an endpoint, and performing rule matching on an event log through the agent to analyze a malicious event log, the method comprising:

grouping event logs using process identifiers (PIDs) and session information;

generating sentences in order of process actions on the basis of the event logs;

analyzing an event log of an endpoint on the basis of a dataset included in the sentences generated in order of the actions; and providing an analysis result of a transformer network and a process tree wherein the analysis result provides a base for detecting a malicious event log or a threat event log obtained in the analyzing of the event log.

2. The method of claim 1, wherein the generating of the sentences is performed on the basis of a transformer model, the transformer model has an encoder layer and a decoder layer, and when a value obtained by adding 1 to a position of an embedding vector of each word in an embedding dimension in positional encoding (PE) of an input-side layer of the encoder layer is an odd value, the transformer model calculates a position (pos) of a word using Equation 1 given below, which is a cosine (cos) function, to generate positional information of a malicious action.

$$PE_{pos,2i+1} = \cos\left(\frac{pos}{10000^{\frac{2i}{D_{event\ analyzer}}}}\right). \quad \text{[Equation 1]}$$

3. The method of claim 1, wherein the generating of the sentences is performed on the basis of a transformer model, the transformer model has an encoder layer and a decoder layer, and when a value obtained by adding 1 to a position of an embedding vector of each word in an embedding dimension in positional encoding (PE) of an input-side layer of the encoder layer is an even value, the transformer model calculates a position of a word using Equation 2 given below, which is a sine (sin) function, to generate positional information of a malicious action.

$$PE_{pos,2i} = \sin\left(\frac{pos}{10000^{\frac{2i}{D_{event\ analyzer}}}}\right). \quad \text{[Equation 2]}$$

4. The method of claim 1, wherein the generating of the sentences is performed on the basis of a transformer model, the transformer model has an encoder layer and a decoder layer, and a decoder structure including the decoder layer is trained to predict a word at each point in time from a sentence matrix and applies a layer for masking words at future points in time to prevent future words from being referenced to a forefront one of decoder sublayers.

5. A method of automatically analyzing an endpoint, the method comprising:

processing logs through process-specific grouping for effective event log analysis;

generating sentences about process actions using a natural language processing (NLP) technique for artificial intelligence (AI) analysis;

datafying malicious actions which are in actual operation and using the data as training data for training an AI model;

generating a learning system based on a transformer algorithm to perform the training of the AI model using the training data;

checking, in real time, a grouped event log through an automatic event maliciousness analyzer based on bidirectional encoder representations from transformers (BERT) and long short-term memory (LSTM) algorithms to analyze an actual malicious action; and when a malicious action target has a certain similarity or more, detecting and automatically judging the malicious action target to be a threat event, wherein a transformer model for the transformer algorithm has an encoder layer and a decoder layer, and a decoder structure including the decoder layer is trained to predict a word at each point in time from a sentence matrix and applies a layer for masking words at future points in time to prevent future words from being referenced to a forefront one of decoder sublayers.

6. The method of claim 5, wherein a transformer model for the transformer algorithm has an encoder layer and a decoder layer, and when a value obtained by adding 1 to a position of an embedding vector of each word in an embedding dimension in positional encoding (PE) of an input-side layer of the encoder layer is an odd value, the transformer model calculates a position (pos) of a word using Equation 1 given below, which is a cosine (cos) function, to generate positional information of a malicious action.

$$PE_{pos,2i+1} = \cos\left(\frac{pos}{10000^{\frac{2i}{D_{event\ analyzer}}}}\right). \quad \text{[Equation 1]}$$

7. The method of claim 5, wherein a transformer model for the transformer algorithm has an encoder layer and a decoder layer, and when a value obtained by adding 1 to a position of an embedding vector of each word in an embedding dimension in positional encoding (PE) of an input-side layer of the encoder layer is an even value, the transformer model calculates a position (pos) of a word using Equation 2 given below, which is a sine (sin) function, to generate positional information of a malicious action.

$$PE_{pos,2i} = \sin\left(\frac{pos}{10000^{\frac{2i}{D_{event\ analyzer}}}}\right). \quad \text{[Equation 2]}$$

8. An apparatus for automatically analyzing an endpoint for endpoint detection and response (EDR) to which an artificial intelligence (AI)-based chatbot engine is applied, the apparatus comprising:

a processor; and a memory, wherein, according to at least one command stored in the memory, the processor is configured to:

process logs through process-specific grouping for effective event log analysis;

generate sentences about process actions using a natural language processing (NLP) technique for AI analysis;

datafying malicious actions which are in actual operation and uses the data as training data for training an AI model;

implement a learning system based on a transformer algorithm to perform the training of the AI model using the training data;

check, in real time, a grouped event log through an automatic event maliciousness analyzer based on bidirectional encoder representations from transformers (BERT) and long short-term memory (LSTM) algorithms to analyze an actual malicious action; and detect and automatically judge a malicious action target to be a threat event when the malicious action target has a certain similarity or more, wherein a transformer model for the transformer algorithm has an encoder layer and a decoder layer, and a decoder structure including the decoder layer is trained to predict a word at each point in time from a sentence matrix and applies a layer for masking words at future points in time to prevent future words from being referenced to a forefront one of decoder sublayers.

9. The apparatus of claim 8, wherein a transformer model for the transformer algorithm has an encoder layer and a decoder layer, and when a value obtained by adding 1 to a position of an embedding vector of each word in an embedding dimension in positional encoding (PE) of an input-side layer of the encoder layer is an odd value, the transformer model calculates a position (pos) of a word using Equation 1 given below, which is a cosine (cos) function, to generate positional information of a malicious action.

$$PE_{pos,2i+1} = \cos\left(\frac{pos}{10000^{\frac{2i}{D_{event\ analyzer}}}}\right). \quad \text{[Equation 1]}$$

10. The apparatus of claim 8, wherein a transformer model for the transformer algorithm has an encoder layer and a decoder layer, and when a value obtained by adding 1 to a position of an embedding vector of each word in an embedding dimension in positional encoding (PE) of an input-side layer of the encoder layer is an even value, the transformer model calculates a position (pos) of a word using Equation 2 given below, which is a sine (sin) function, to generate positional information of a malicious action, $$PE_{pos,2i} = \sin\left(\frac{pos}{10000^{\frac{2i}{D_{event\ analyzer}}}}\right). \quad \text{[Equation 2]}$$

* * * * *